No. 663,614. Patented Dec. 11, 1900.
C. RIEDMÜLLER.
ADVERTISING DEVICE.
(Application filed Sept. 23, 1899.)
(No Model.) 2 Sheets—Sheet 1.
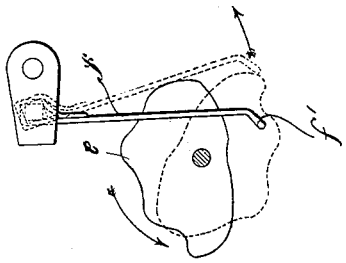
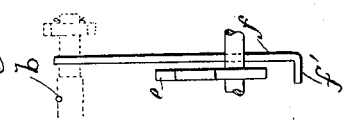
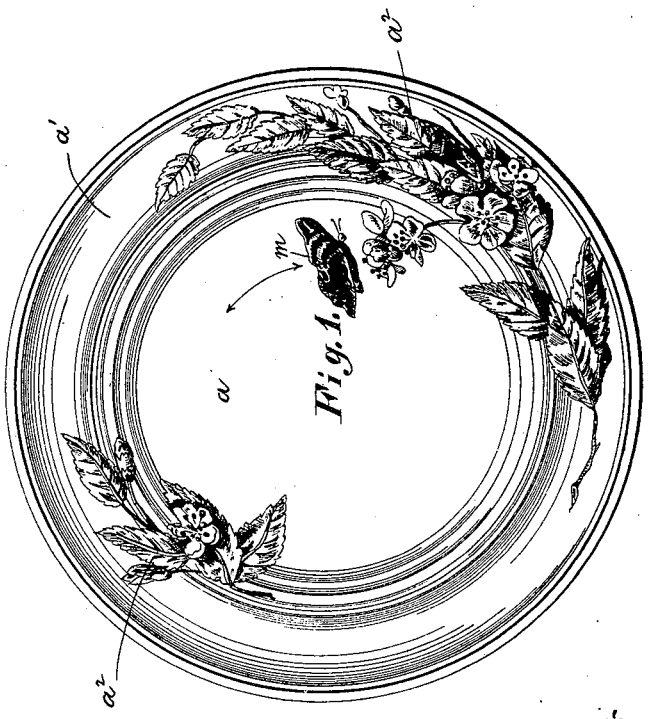

No. 663,614. Patented Dec. 11, 1900.
C. RIEDMÜLLER.
ADVERTISING DEVICE.
(Application filed Sept. 23, 1899.)
(No Model.) 2 Sheets—Sheet 2.
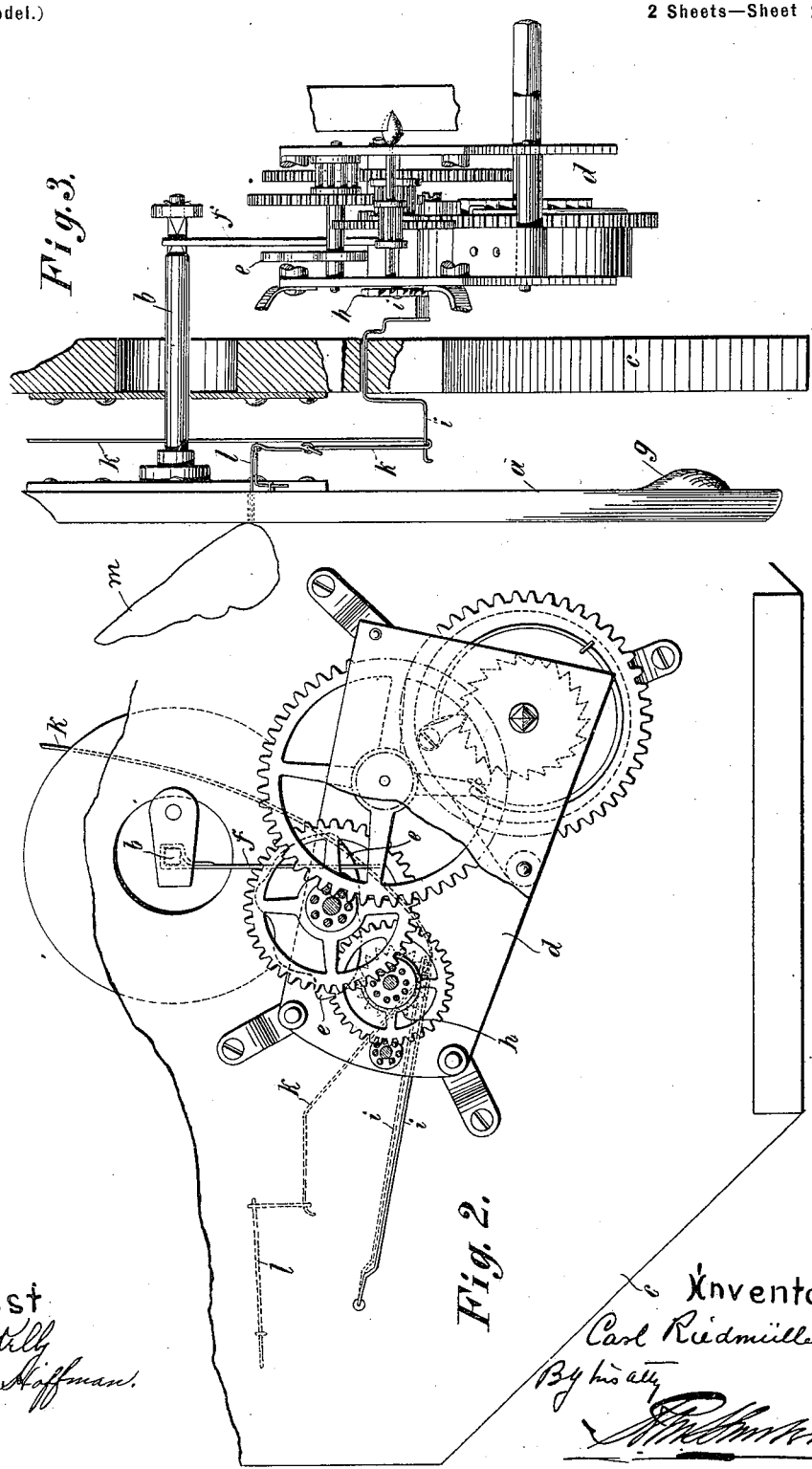
Attest
R. M. Kelly
D. H. Hoffman.
Inventor
Carl Riedmüller
By his atty

UNITED STATES PATENT OFFICE.

CARL RIEDMÜLLER, OF NEW ULM, GERMANY.

ADVERTISING DEVICE.

SPECIFICATION forming part of Letters Patent No. 663,614, dated December 11, 1900.

Application filed September 23, 1899. Serial No. 731,412. (No model.)

*To all whom it may concern:*

Be it known that I, CARL RIEDMÜLLER, a subject of the King of Bavaria, residing at New Ulm, in the Kingdom of Bavaria, Germany, have invented certain new and useful Improvements in Advertising Devices, of which the following is a specification.

This invention relates to an advertising device, and is intended to produce the appearance of a naturally moving or flying object.

To this end the invention resides in the combination of a moving or oscillating plate carrying the moving object with a relatively stationary frame carrying relatively stationary objects and concealing the edges of the moving or oscillating plate, so that its movements cannot be perceived.

The invention also consists in the employment of a movable or oscillating reflector or mirror by which the moving object is carried, whereby the reflection of the object in the mirror has the effect of heightening the optical delusion, and an object consisting of only one-half of the entire object sought to be represented may be employed. This effect is further enhanced by the vibration of the moving object carried by the oscillating plate or mirror; and the invention further consists in the combination, with an oscillating or moving mirror, of a vibrating object carried thereby and consisting of one-half of the entire object sought to be represented.

In the accompanying drawings, Figure 1 is a plan view of an advertising device embodying the invention. Fig. 2 is an inverted plan view, on an enlarged scale, of the operating mechanism. Fig. 3 is a side elevation of the same with parts in vertical section, and Figs. 4 and 5 are detail views of the mechanism for oscillating the mirror or reflector.

$a$ is an outer frame, upon which may be painted or affixed suitable objects, such as the flowers $a^2$, forming the portion of picture or group of objects with reference to which the movable part or object is to be moved. These objects $a^2$ may be either articles carried by the frame $a$ or pictures painted thereon. This outer frame $a$ is provided with an opening in which is located a movable plate, reflector, or mirror $a'$, so arranged that its outer edge will be concealed by the frame.

$m$ is an object carried by the reflector or mirror $a'$ and moving therewith with reference to the fixed objects $a^2$.

A suitable motor, such as clockwork $d$, may be employed to impart motion to the reflector or mirror.

As the movement of the plate or mirror $a'$ is not perceptible, the effect produced by its oscillation or movement is that of the movement of the object $m$ with reference to the objects $a^2$. In the drawings I have shown as the object $m$ a butterfly, and by imparting an oscillation to the plate $a'$ this butterfly appears to move from one flower to another. This effect is heightened by imparting a vibration to the object $m$ with reference to the plate $a'$, and by employing a mirror $a'$, in which the movements of the object $m$ are reflected, a most natural effect can be produced. To this end the object $m$ should be only half of the actual object sought to be represented, the remainder of the object being produced by the reflection in the mirror. Thus in the drawings I have shown one-half of a butterfly, and by imparting a vibrating movement to this portion the effect is produced of two moving wings and the butterfly appears to be flying as it is moved by the plate from one flower to another.

The particular mechanism employed for imparting the movements to the plate or mirror $a'$ and the object $m$ is not material to the invention, as many forms of power-transmitting devices to impart the desired movements will readily suggest themselves to those skilled in the art.

The particular construction shown by me for oscillating the plate $a'$ is as follows: $b$ is a shaft journaled in suitable brackets in the frame $c$ and carrying the plate or mirror $a'$. On the shaft $b$ is an arm $f$, terminating in a projection $f'$, which is acted upon by a cam $e$, driven by the motor $d$. By employing an irregular cam, such as is shown, an oscillating movement can be imparted to the shaft $b$ and mirror $a'$. To impart vibrations to the object $m$, I have shown an elbow-lever $i$, journaled in the frame $c$ and acted upon at one end by a star-wheel $h$, driven by the motor $d$, with the other end engaging a spring-arm $k$, secured to the back of the plate $a'$ and connected by a stirrup $l$ through the plate $a'$ with the object $m$. The oscillation of the spring $k$ through the elbow-lever $i$ will impart through the stirrup $l$ a vibration to the object $m$.

While I have shown the object $m$ as half of a butterfly, other suitable objects—such, for example, as a beetle, bird, or angel—may be employed. These and other details may be varied without departing from the invention.

What I claim as new, and desire to secure by Letters Patent, is as follows:

1. An advertising device, consisting of a frame containing suitable objects $a^2$, a movable plate arranged adjacent thereto, and having its edges concealed thereby, an object carried by said movable plate and adapted to be moved thereby with reference to the objects $a^2$, and a motor device to oscillate said plate.

2. An advertising device, consisting of a frame containing suitable objects $a^2$, a movable plate arranged adjacent thereto, and having its edges concealed thereby, an object carried by said movable plate and adapted to be moved thereby with reference to the objects $a^2$, a motor device to oscillate said plate, and means to vibrate said object as it is carried by said movable plate.

3. In an advertising device, the combination of a frame containing objects $a^2$, a movable mirror having its edges concealed by said frame, a motor to impart movements to said mirror, and an object carried by said mirror and moving therewith.

4. In an advertising device, the combination of a frame containing objects $a^2$, a movable mirror having its edges concealed by said frame, a motor to impart movements to said mirror, an object carried by said mirror and moving therewith, and means to vibrate said object as it is carried by said mirror.

5. In an advertising device, the combination of a frame containing objects $a^2$, a movable mirror having its edges concealed by said frame, a motor to impart movements to said mirror, and an object consisting of one-half of the entire object sought to be represented carried by said mirror and moving therewith.

6. In an advertising device, the combination of a frame containing objects $a^2$, a movable mirror having its edges concealed by said frame, a motor to impart movements to said mirror, an object consisting of one-half of the entire object sought to be represented carried by said mirror and moving therewith, and means to vibrate said object as it is carried by said mirror.

7. In an advertising device, the combination with an oscillating mirror, of a vibrating object carried thereby and consisting of one-half of the entire object sought to be represented.

In testimony whereof I have hereunto set my hand in the presence of two witnesses.

CARL RIEDMÜLLER.

Witnesses:
 CARL HELLER,
 EMIL HENZEL.